(12) United States Patent
Meier

(10) Patent No.: US 11,076,605 B2
(45) Date of Patent: Aug. 3, 2021

(54) DOUGH PORTIONING APPARATUS

(71) Applicant: Werner & Pfleiderer Lebensmitteltechnik GmbH, Dinkelsbühl (DE)

(72) Inventor: Alexander Meier, Dürrwangen (DE)

(73) Assignee: Werner & Pfleiderer Lebensmitteltechnik GmbH, Dinkelsbühl (DE)

( * ) Notice: Subject to any disclaimer, the term of this patent is extended or adjusted under 35 U.S.C. 154(b) by 8 days.

(21) Appl. No.: 16/438,020

(22) Filed: Jun. 11, 2019

(65) Prior Publication Data
US 2019/0380351 A1    Dec. 19, 2019

(30) Foreign Application Priority Data
Jun. 13, 2018    (DE) ...................... 20 2018 103 311.5

(51) Int. Cl.
*A21C 5/06* (2006.01)
(52) U.S. Cl.
CPC ..................... *A21C 5/06* (2013.01)
(58) Field of Classification Search
CPC ....................................................... A21C 5/06
See application file for complete search history.

(56) References Cited

U.S. PATENT DOCUMENTS

| | | | |
|---|---|---|---|
| 1,080,890 A | 12/1913 | Carroll | |
| 3,794,234 A | 2/1974 | Pardo | |
| 4,778,079 A | 10/1988 | Judex | |
| 5,211,968 A | 5/1993 | Judex | |
| 5,775,804 A | 7/1998 | Meier | |
| 2004/0258819 A1 | 12/2004 | Bodenstorfer | |

(Continued)

FOREIGN PATENT DOCUMENTS

| | | |
|---|---|---|
| CA | 3039529 A1 | 4/2018 |
| DE | 3530724 C1 | 7/1986 |
| DE | 19640176 A1 | 4/1998 |

(Continued)

OTHER PUBLICATIONS

EPO Search Opinion, application EP 19176854, dated Jan. 14, 2020, with machine translation (Year: 2020).*

*Primary Examiner* — Timothy Kennedy
(74) *Attorney, Agent, or Firm* — Smartpat PLC

(57) ABSTRACT

A multiple-row dough portioning apparatus includes at least one portioning chamber to define a portioned dough quantity, at least one metering piston, which is displaceable in the portioning chamber between a retracted metering position and an extended ejection position. The dough portioning apparatus comprises a drive unit having a control component. The drive unit is configured to displace the metering piston from the metering position into the ejection position. The dough portioning apparatus is configured such that a displacement of the metering pistons takes place exclusively on account of a pressure exerted on the metering pistons by the dough. The control component is connected to all metering pistons to transmit a tensile force from the control roller to the metering pistons. The portioning chamber is accommodated in a portioning cylinder, which is pivotable between a metering pivot position and a pivoted ejection pivot position.

10 Claims, 8 Drawing Sheets

(56) References Cited

U.S. PATENT DOCUMENTS

2009/0161477 A1   6/2009  Meier et al.
2018/0084789 A1   3/2018  Meier

FOREIGN PATENT DOCUMENTS

| DE | 102013221230 A1 | 4/2015 |
| EP | 0643914 B1 | 1/1999 |
| EP | 2071955 A3 | 3/2011 |
| EP | 3298900 A1 | 3/2018 |
| GB | 191003771 A | 2/1911 |
| WO | 2018064701 A1 | 4/2018 |

* cited by examiner

DOUGH PORTIONING APPARATUS

CROSS-REFERENCE TO RELATED APPLICATIONS

This application claims the priority of German Utility Model Application, Serial No. DE 20 2018 103 311.5, filed on Jun. 13, 2018, pursuant to 35 U.S.C. 119(a)-(d), the content of which is incorporated herein by reference in its entirety as if fully set forth herein.

TECHNICAL FIELD

The invention relates to an in particular multiple-row dough portioning apparatus with at least one portioning chamber to define a portioned dough quantity and at least one metering piston, which is vertically displaceable in the portioning chamber.

BACKGROUND

Dough portioning apparatuses of this type are known from DE 10 2013 221 230 A1, from EP 2 071 955 B1, from EP 3 298 900 A, from DE 196 40 176 A1, and from EP 0 643 914 A1.

SUMMARY

An object of the present invention is to refine a multiple-row dough portioning apparatus in such a way that its portioning accuracy is improved, in particular when comparing the individual rows of the dough portioning apparatus.

This object is achieved by a multiple-row dough portioning apparatus with a plurality of portioning chambers to define a portioned dough quantity, with a plurality of metering pistons, which are each displaceable in the portioning chambers between a retracted metering position in which the respective metering piston defines a predetermined portioning volume in the respective portioning chamber, and an extended ejection position, with a drive unit having a control component, the drive unit being configured to displace the metering piston from the metering position into the ejection position, the dough portioning apparatus being configured such that a displacement of the metering pistons takes place exclusively on account of a pressure exerted on the metering pistons by the dough, wherein the control component is connected to all metering pistons to transmit a tensile force from the control roller to the metering pistons.

The inventor found that a control component, which is connected to all metering pistons to transmit a tensile force from the control roller to the metering pistons, ensures that all metering pistons are moved into the metering position in the same end position on account of a corresponding tensile force transmitted by the control roller. Consequently, a dough processing apparatus is obtained such that when the metering position is reached, there are no deviations between the various metering pistons of the rows of the dough portioning device, resulting in a correspondingly high portioning accuracy, in particular when comparing the rows of the dough portioning apparatus. This accuracy may result in a relative deviation, which is smaller than 2%, which is smaller than 1%, and which may even be smaller than 0.5%.

The embodiment comprising a control roller configured to interact with a control cam of the drive unit proved to be particularly advantageous from a kinematic point of view.

A connecting unit between the respective metering pistons and the control component has a lug/bolt connection provides a degree of freedom for a pivoting movement between the metering piston and the control component. A degree of freedom of this type may prevent jamming, in particular during a displacement of the metering pistons.

A plastic metering piston made of plastics may ensure low wear.

Another object of the invention is to provide a dough portioning apparatus, which, compared to prior art apparatuses, provides a larger portioning volume at a given size in particular of the portioning cylinder, or which has an in particular smaller-sized portioning cylinder at a given portioning volume.

This object is achieved by a dough portioning apparatus with at least one portioning chamber to define a portioned dough quantity, with at least one metering piston, which is vertically displaceable in the portioning chamber between a retracted metering position in which the metering piston defines a predetermined portioning volume in the portioning chamber, and an extended ejection position, wherein the portioning chamber is accommodated in a portioning cylinder, which is pivotable between a metering pivot position in which the metering piston defines the predetermined portioning volume in the metering position, and a pivoted ejection pivot position in which the metering piston is displaceable into the ejection position in order to deliver a dough portion to a downstream processing unit, wherein a displacement stroke of the metering piston between the metering position and the ejection position is greater than half a diameter of the portioning cylinder.

It was surprisingly found that it is possible to implement a displacement stroke of the metering piston in the portioning chamber, and therefore in the portioning cylinder, greater than half a diameter of the portioning cylinder in such a way that jamming problems, which are a common problem in apparatuses of this type, are prevented. The displacement stroke may be greater than 55% of the diameter of the portioning cylinder, and may amount to for example 57% of the diameter of the portioning cylinder.

A guide surface arrangement configured to guide the respective metering piston in the associated portioning chamber in such a way that an axial distance of the two axially spaced guide surfaces is smaller than one third of the diameter of the portioning cylinder is compact but still ensures, which is in fact surprising, a sufficient guide stability of the metering piston in the portioning chamber. A guide direction of the metering piston in the portioning chamber is perpendicular to the diameter dimension of the portioning cylinder, and is in particular perpendicular to a pivot axis when pivoting the portioning cylinder between the metering pivot position and the ejection pivot position. In other words, this pivot axis about which the diameter of the portioning cylinder is measured does not extend along the guide direction of the metering piston during its displacement between the metering position and the ejection position. The axial distance of the guide surfaces can be smaller than 30% of the diameter of the portioning cylinder, can be smaller than 25%, and can even be smaller than 20% of the diameter of the portioning cylinder. Instead of a plurality of guide surfaces, the metering piston can also be guided in the associated portioning chamber by precisely one metering piston guide surface. An axial extension of such a single guide surface of the metering piston is then also smaller than one third of the diameter of the portioning cylinder, and— depending on the embodiment—can even be smaller than 30%, smaller than 25% or smaller than 20% of the diameter of the portioning cylinder.

The advantages of the dough portioning apparatus with the greater displacement stroke of the metering piston between the metering position and the ejection position are particularly evident in a multiple-row configuration with a corresponding plurality of portioning chambers and metering pistons.

The dough portioning apparatus with the greater displacement stroke of the metering piston between the metering position and the ejection position may further have those features that have been explained above in conjunction with the transmission of tensile forces between the control component and all metering pistons.

The advantages of a dough processing plant correspond to those that have already been explained above in conjunction with the dough portioning apparatus.

Exemplary embodiments of the invention will hereinafter be explained in more detail by means of the drawing.

DETAILED DESCRIPTION

Figure 1:
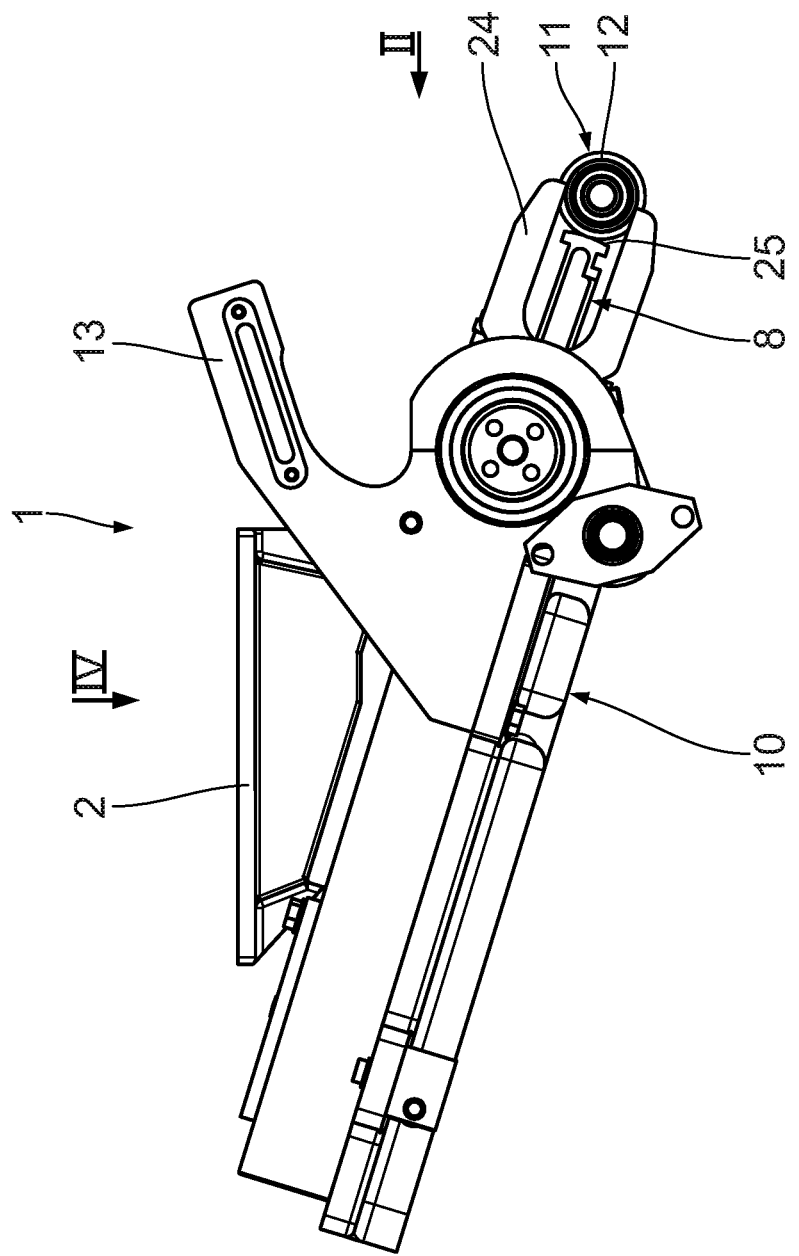
FIG. 1 shows a side view of a portioning module of a multiple-row dough portioning apparatus.
Figure 2:
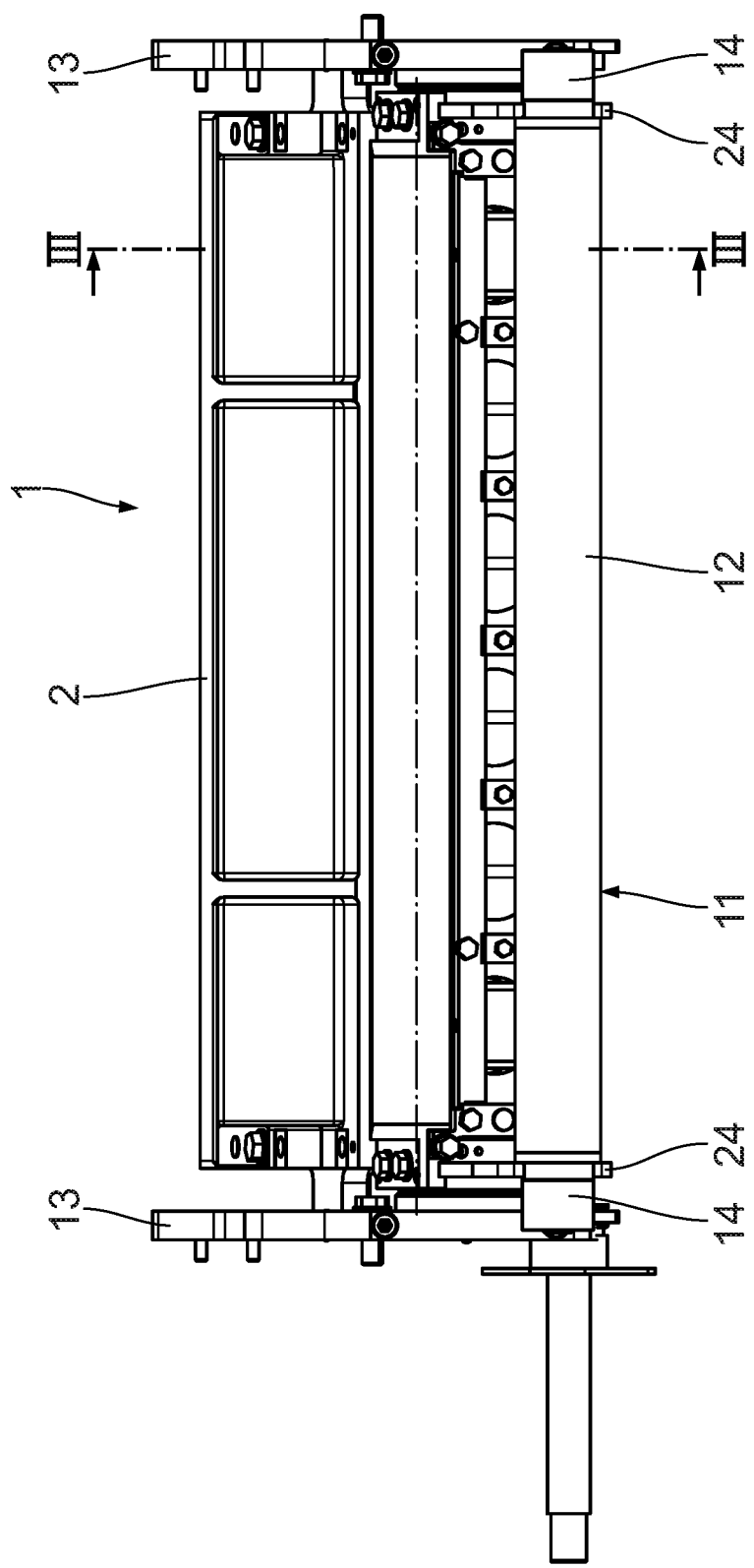
FIG. 2 shows a side view of the portioning module, seen from viewing direction II in FIG. 1.

A dough processing plant is used for portioning and for kneading dough, for example when producing rolls, the drawing showing a portioning module 1 of a dough portioning apparatus of said dough processing plant, the dough portioning apparatus comprising four rows in the embodiment shown. Corresponding dough processing plants are known from DE 10 2013 221 230 A1, from EP 2 071 955 B1, from EP 3 298 900 A, from DE 196 40 176 A1, and from EP 0 643 914 A1.

Dough (not shown) can be filled into a feed hopper 2 (cf. FIG. 1, for example). A discharge opening 3 (cf. FIG. 3) provided at the bottom of the feed hopper 2 communicates with a delivery chamber 4 in which a delivery piston moves that is not shown in the drawing. Together with the feed hopper 2, the delivery piston forms a dough feed device of the dough processing plant.

Figure 3:
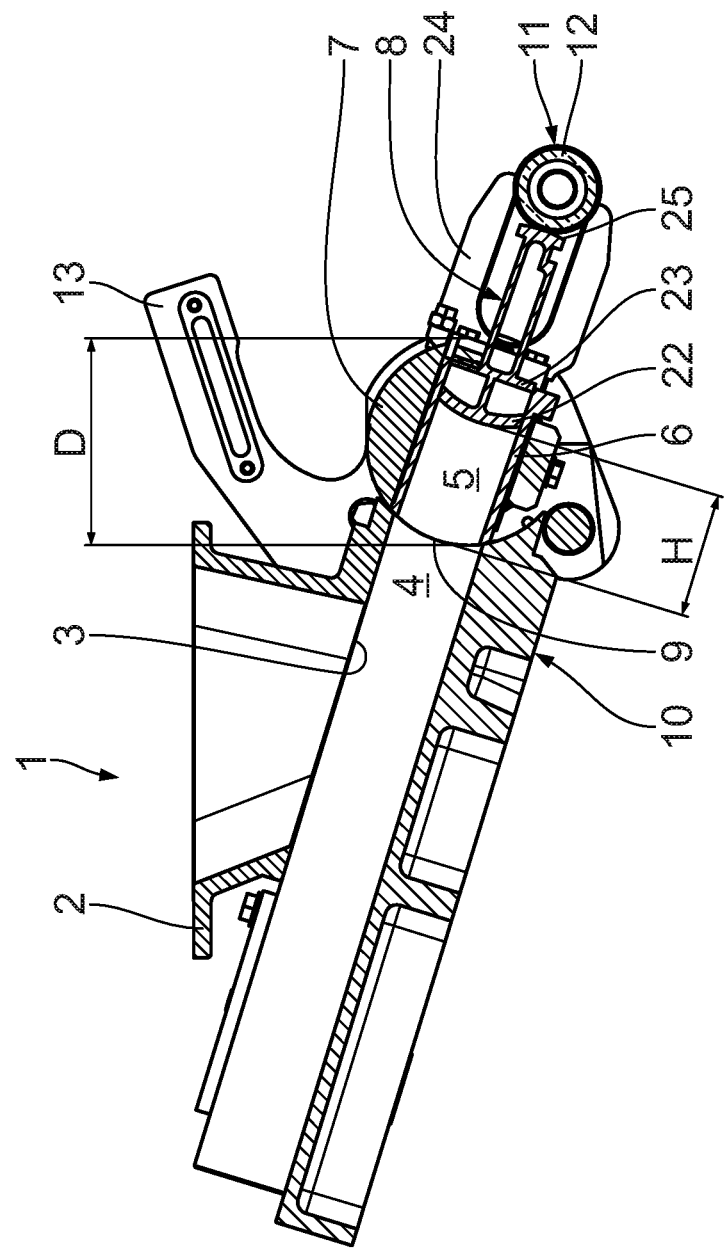
FIG. 3 shows a sectional view along line III-III in FIG. 2.
Figure 4:
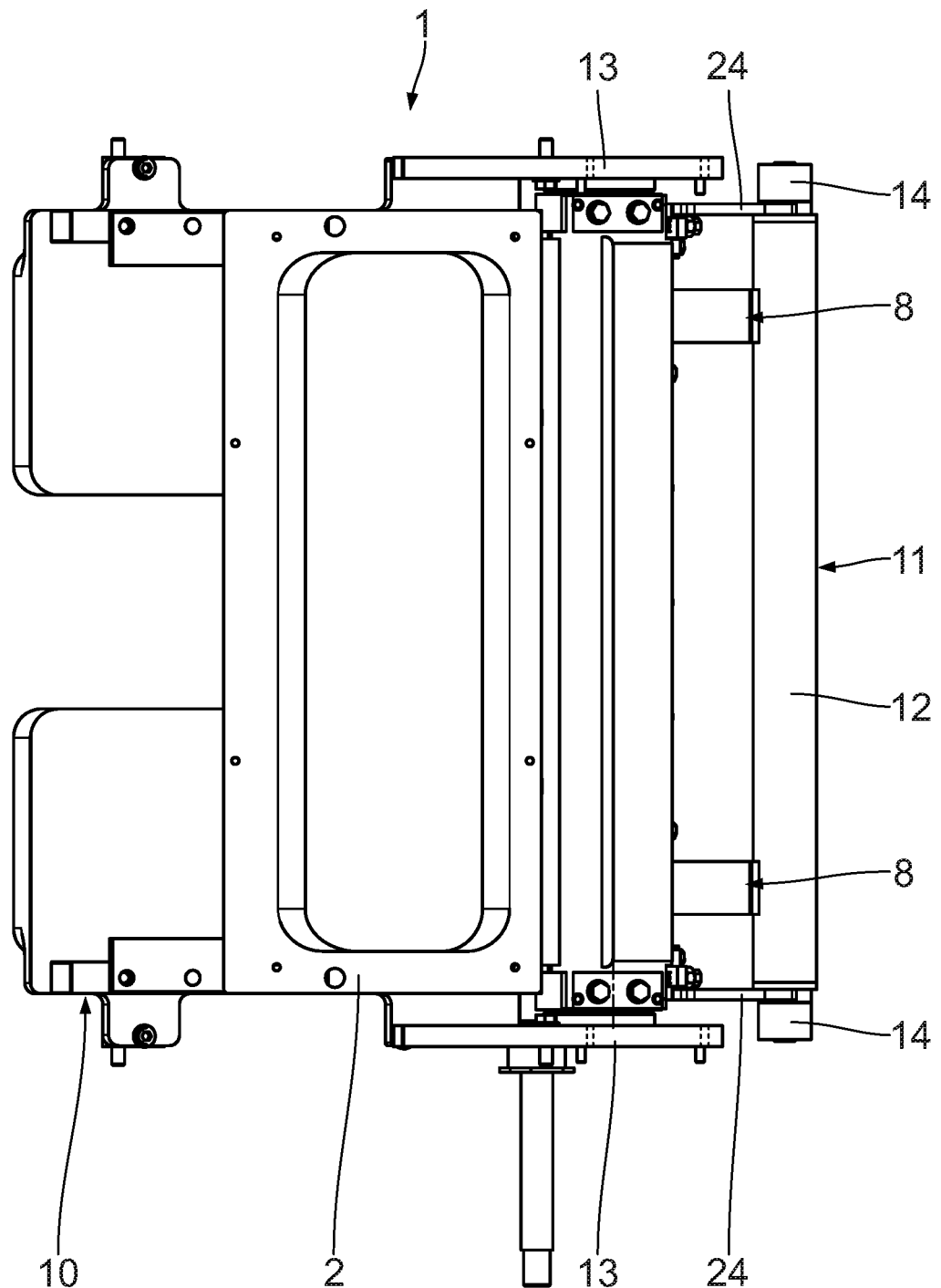
FIG. 4 shows a top view, seen from viewing direction IV in FIG. 1.
Figure 5:
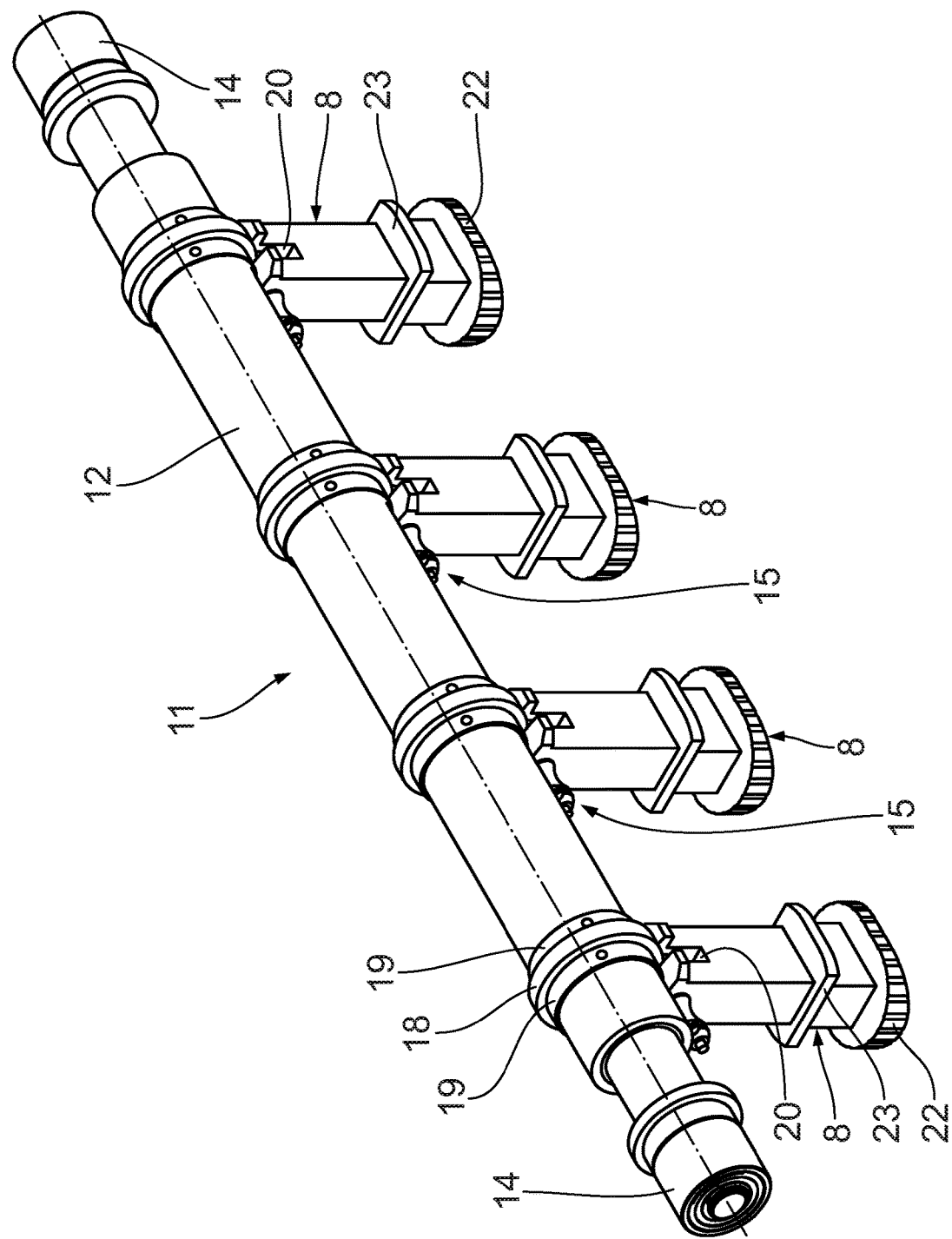
FIG. 5 shows a perspective view of a control component, configured as a control roller, of a drive unit of the dough portioning apparatus together with the metering pistons connected to the control roller.
Figure 6:
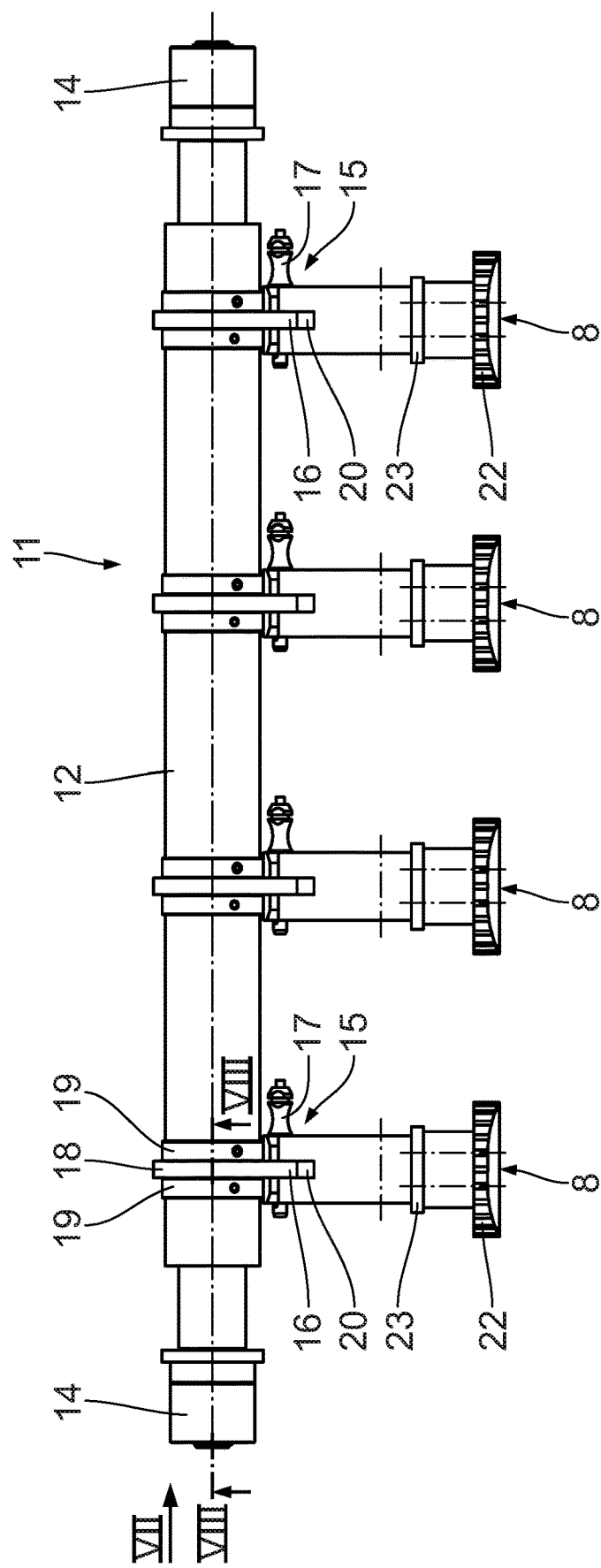
FIG. 6 shows a top view of the assembly as shown in FIG. 5.
Figure 7:
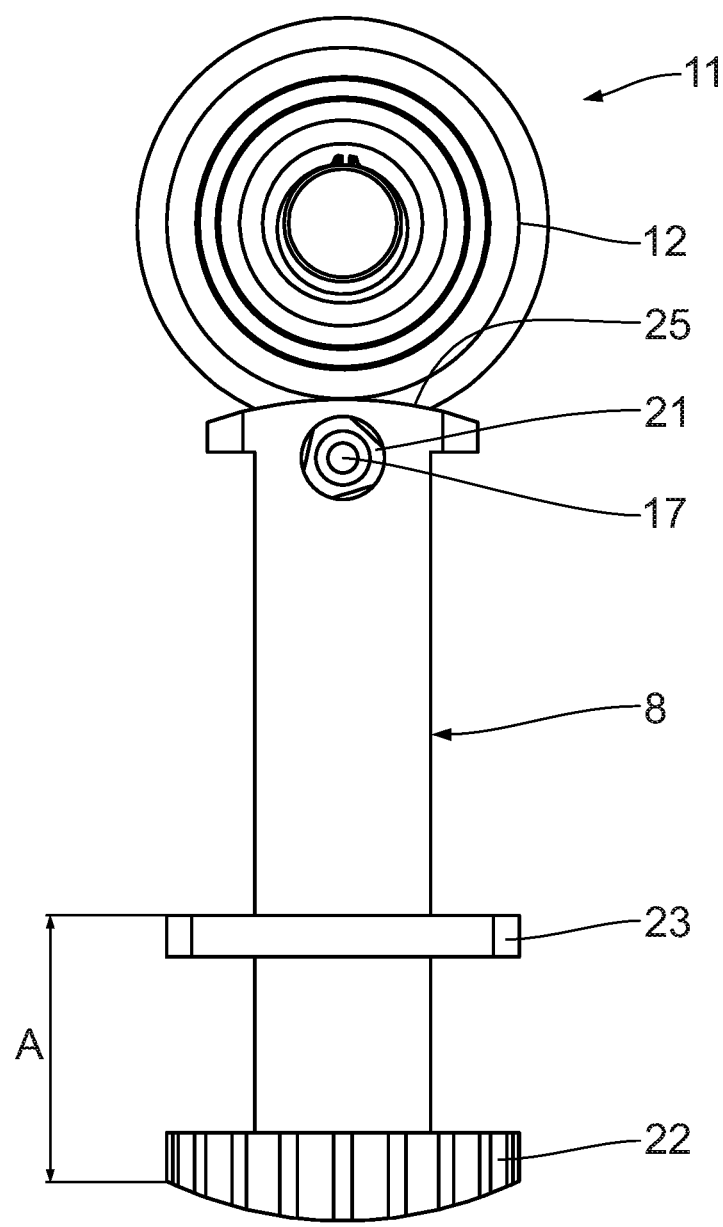
FIG. 7 shows a side view of the assembly from viewing direction VII in FIG. 6.

The overall dough processing plant has a multiple-row configuration comprising a corresponding plurality of portioning chambers 5 each configured to define a portioned dough quantity. In the embodiment shown, there are a total of four such portioning chambers 5 arranged adjacent to each other and perpendicular to the drawing plane of FIGS. 1 and 3, for example. Circumferential walls 6 of the portioning chambers 5 are embodied in a portioning cylinder 7, which can be driven, by a pivot drive not shown in more detail, to perform a pivoting movement about a pivot axis arranged perpendicular to the drawing plane of FIGS. 1 and 3. The portioning cylinder 7 is also referred to as rotary vane. In FIGS. 1 and 3, the portioning cylinder 7 is in a metering pivot position in which the portioning chambers 5 are flush with the delivery chamber 4 and are in a dough delivery connection with said delivery chamber 4.

A metering piston 8 is arranged in each of the portioning chambers 5. The respective metering piston 8 has an oval piston cross-section. Alternatively, a piston cross-section of the metering piston may also be circular. In the portioning chamber 5 associated thereto, the respective metering piston 8 is vertically displaceable between a retracted metering position shown in FIG. 3 and an extended ejection position. In the ejection position, a front-end piston surface of the respective metering piston 8 is flush with a pivoting guide wall 9 which forms at the same time a transition between the portioning cylinder 7 and a housing 10 of the portioning module 1.

The metering pistons 8 can be made of plastics.

A drive unit 11, which has a control component configured as a control roller 12, is provided to displace the metering pistons 8 from the metering position into the ejection position. The dough portioning apparatus is configured in such a way that a displacement of the metering pistons 8 from the ejection position into the metering position takes place exclusively on account of a delivery pressure exerted on the metering pistons 8 by the dough supplied.

The control roller 12 has a longitudinal extension perpendicular to the drawing plane of FIGS. 1 and 3. The control roller 12 is connected to all metering pistons 8 to transmit a tensile force from the control roller 12 to the metering pistons 8. The transmission of said tensile force ensures that when the metering pistons 8 are being displaced from the ejection position into the metering position, they are all moved, by means of the control roller 12, into the metering position where they assume the same relative end position in relation to the respective portioning chamber 5. Positional deviations between the various metering pistons 8 of the dough portioning apparatus, which are caused by differences in the guide forces of a guidance of the respective measuring piston in the associated portioning chamber 5, caused by residual dough, for example, are thus prevented when the metering position is reached. Therefore, in the metering position, the metering pistons 8 all define precisely the same volume in the portioning chamber 5, and, therefore, precisely the same dough portion in each row of the dough portioning apparatus, on account of this transmission of said tensile force. Relative quantity deviations between the dough portions defined by the various rows of the dough portioning apparatus, in other words by the various metering pistons 8, may be smaller than 2%, smaller than 1%, and may even be smaller than 0.5%.

Figure 8:
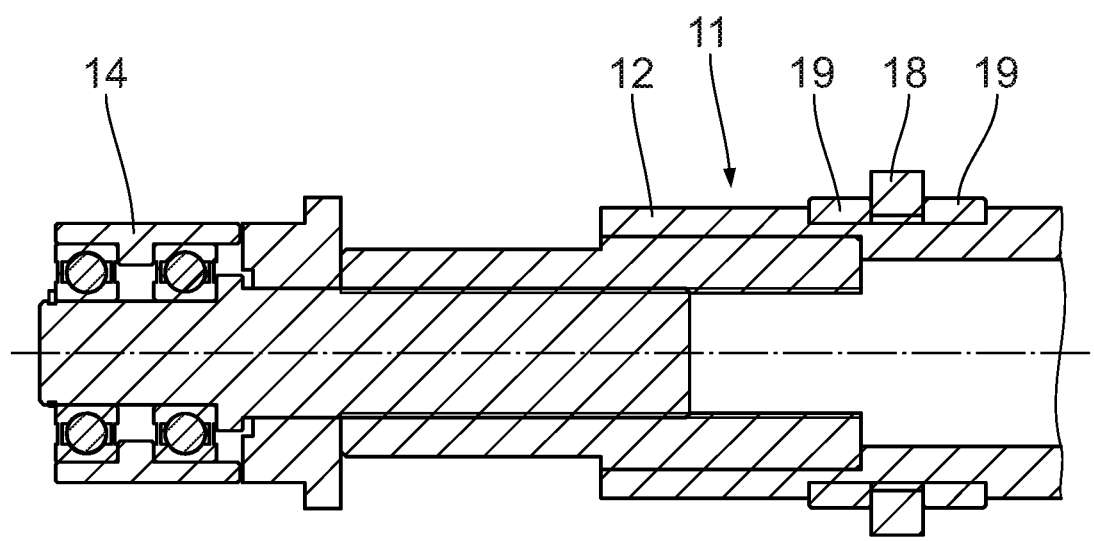
FIG. 8 shows a sectional view along line VIII-VIII in FIG. 6.

The drive unit 11 further includes at least one control cam 13 (cf. FIGS. 1 to 4), which interacts with the control roller 12. The control cam 13 is configured in two parts and interacts with opposing free axial control sections 14 of the control roller 12. Contrary to the remaining control roller 12, the end sections 14 are mounted for rotation as shown in FIG. 8.

The transmission of tensile forces between the control roller 12 and all metering pistons 8 is guaranteed by a connecting unit 15 between the respective metering piston 8 and the control roller 12, said connecting unit 15 being particularly visible in FIGS. 5 to 8. Said connecting unit 15 has been omitted in FIGS. 1 to 4.

The connecting unit 15 has a lug/bolt connection with a lug 16 through which a connecting bolt 17 is guided. The lug 16 is formed in one piece with an annular collar 18 of the respective connecting unit 15, said annular collar 18 in turn surrounding the control roller 12. An axial position of the respective annular collar 18 on the control roller 12 is fixed by in each case two fixing rings 19, which receive the respective annular collar 8 of the respective connecting unit 15 between one another and are also arrange d such as to surround the control roller 19.

At its end facing the control roller 12, the respective metering piston 8 has a forked recess 20 in which the lug 16 of the annular collar 18 immerses. In said free end, through openings 21 are formed flush with an eye of the lug 16, the through openings 21 receiving the eye of the lug 16 between one another. The connecting bolt 17 is guided through the two through openings 21 of the metering piston 8 and the eye of the lug 16 provided therebetween to create the tensile force transmitting connection between the respective metering piston 8 and the control roller 12. On account of this lug/bolt connection of the connecting unit 15, a degree of freedom is obtained for a pivoting movement of the connection about the axis of the connecting bolt 17. A degree of freedom of this type between the respective metering piston 8 and the control roller 12 may prevent the metering piston 8 from getting jammed during a guided movement thereof.

A diameter of the portioning cylinder 17 is highlighted at D in FIG. 3. A displacement stroke of the metering piston 8 between the retracted metering position and the extended ejection position, which is illustrated at H in FIG. 3, is greater than half the diameter D/2 of the portioning cylinder 7.

The respective metering piston 8 is guided in the associate portioning chambers 5, namely along the circumferential walls 6, by two guide surfaces 22, 23 axially spaced from one another. An axial distance A of the guide surfaces 22, 23 (cf. FIG. 7), in other words an effective axial guide surface extension of the metering piston 8, is smaller than one third of the diameter D of the portioning cylinder 7. Instead of a plurality of guide surfaces to provide guidance in the portioning chamber 5, the respective metering piston 8 may also be provided with precisely one guide surface. The axial extension of such a single guide surface is then identical to the axial distance of the guide surfaces as described above.

The displacement of the metering piston between the metering position and the ejection position is guided by a guide fork 24, which is configured in two parts. The control roller 12 moves in said guide fork 24. In the metering position of the metering piston 8, the control roller 12 is disposed near a free end of the guide fork 24 as shown in FIG. 3.

When the dough is being portioned, the dough pressure generated when the dough is being delivered from the delivery chamber 4 into the portioning chamber 5 ensures that the metering pistons 8, which are initially in the ejection position, are moved into the metering position, shown for example in FIG. 3, on account of said dough pressure.

The respective metering piston 8 is in a thrust connection, via a punch surface 25, with the control roller 12. Said thrust connection ensures that the control roller 12 has been displaced in the metering position, shown in FIG. 3, in the region of the free end of the guide fork 24.

The tensile connection provide by the respective connecting units 15 between the control roller 12 and all metering pistons 8 ensures that all metering pistons 8 assume precisely the same position in terms of their relative positioning in the respective portioning chamber 5, irrespective of an amount of friction of a movement of the individual metering pistons 8 along the guide surfaces 22, 23.

Having reached the metering position, the portioning cylinder 7 is displaced in a counter-clockwise direction from the metering pivot position in FIG. 3 into the ejection pivot position. Subsequently, the metering pistons 8 are driven, by the drive unit 11 in conjunction with the control roller 12 and the control cam 13, to move from the metering position into the ejection position. This causes the dough portion, which, up to this moment, is disposed in the portioning chamber 5, to be delivered to a downstream processing unit of the dough processing plant.

What is claimed is:

1. A dough portioning apparatus,
   comprising a multiple-row configuration with a corresponding plurality of portioning chambers and metering pistons,
   wherein the plurality of portioning chambers define a portioned dough quantity,
   wherein the plurality of metering pistons are each displaceable in the portioning chambers
      between a retracted metering position in which the respective metering piston defines a predetermined portioning volume in the respective portioning chamber,
      and an extended ejection position,
   wherein the respective portioning chamber is accommodated in a portioning cylinder, which is pivotable between
      a metering pivot position in which the metering piston defines the predetermined portioning volume in the metering position,
      and a pivoted ejection pivot position in which the metering piston is displaceable into the ejection position in order to deliver a dough portion to a downstream processing unit,
   wherein a displacement stroke of the respective metering piston between the metering position and the ejection position is greater than half a diameter of the respective portioning cylinder,
   wherein the metering piston is in each case guided in the associated portioning chamber by two axially spaced guide surfaces, an axial distance of the guide surfaces being smaller than one third of the diameter of the portioning cylinder,
   wherein the dough portioning apparatus comprises a drive unit having a control component, the drive unit being configured to displace the metering piston from the metering position into the ejection position, the dough portioning apparatus being configured such that a displacement of the metering pistons takes place exclusively on account of a pressure exerted on the metering pistons by the dough,
   wherein the control component is configured as a control roller, which is configured to interact with a control cam of the drive unit,
   wherein the control component is connected to all metering pistons to transmit a tensile force from the control component to the metering pistons, wherein the transmission of said tensile force results in all metering pistons being brought into the same relative end position in the metering position in relation to the respective portioning chamber via the control roller during the stroke displacement from the ejection position into the metering position.

2. The dough portioning apparatus as claimed in claim 1, wherein a connecting unit between the respective metering pistons and the control component has a lug/bolt connection.

3. The dough portioning apparatus as claimed in claim 2, wherein the metering piston is made of plastic.

4. A dough processing plant with a dough portioning apparatus as claimed in claim 1.

5. The dough portioning apparatus according to claim 1, wherein the guide direction of the metering piston in the portioning chamber is perpendicular to the diameter dimension of the portioning cylinder.

6. The dough portioning apparatus according to claim 1, wherein the guide direction of the metering piston in the portioning chamber is perpendicular to a pivot axis when pivoting the portioning cylinder between the metering pivot position and the ejection pivot position.

7. The dough portioning apparatus according to claim 1, wherein the axial distance of the guide surfaces can be smaller than 30% of the diameter of the portioning cylinder.

8. The dough portioning apparatus according to claim 1, wherein the axial distance of the guide surfaces can be smaller than 25% of the diameter of the portioning cylinder.

9. The dough portioning apparatus according to claim 1, wherein the axial distance of the guide surfaces can be smaller than 20% of the diameter of the portioning cylinder.

10. The dough portioning apparatus according to claim 1,
    wherein the control roller is guided, at opposite axial ends thereof, within a guide fork, and
    wherein the guide fork is mounted to the portioning cylinder.

\* \* \* \* \*